(12) United States Patent
Inaba et al.

(10) Patent No.: US 7,132,073 B2
(45) Date of Patent: Nov. 7, 2006

(54) PROCESS FOR PRODUCING MULTILAYERED PRODUCT

(75) Inventors: Takeshi Inaba, Settsu (JP); Masakatsu Kitano, Toyonaka (JP)

(73) Assignee: Daikin Industries, Ltd., Osaka (JP)

( * ) Notice: Subject to any disclaimer, the term of this patent is extended or adjusted under 35 U.S.C. 154(b) by 9 days.

(21) Appl. No.: 10/239,244

(22) PCT Filed: Mar. 23, 2001

(86) PCT No.: PCT/JP01/02366

§ 371 (c)(1),
(2), (4) Date: Nov. 19, 2002

(87) PCT Pub. No.: WO01/70485

PCT Pub. Date: Sep. 27, 2001

(65) Prior Publication Data

US 2004/0060642 A1    Apr. 1, 2004

(30) Foreign Application Priority Data

Mar. 23, 2000    (JP) .............................. 2000-082131

(51) Int. Cl.
B29C 47/06    (2006.01)

(52) U.S. Cl. .......................... 264/171.28; 264/173.14; 264/173.19; 264/331.14

(58) Field of Classification Search ........... 264/171.28, 264/173.14, 173.19, 331.14
See application file for complete search history.

(56) References Cited

U.S. PATENT DOCUMENTS

| 5,500,257 | A |   | 3/1996 | Krause et al. |
| 5,576,106 | A | * | 11/1996 | Kerbow et al. ............. 428/403 |
| 5,855,977 | A | * | 1/1999 | Fukushi et al. ............ 428/36.6 |
| 6,074,576 | A | * | 6/2000 | Zhao et al. ................. 252/500 |
| 6,165,575 | A | * | 12/2000 | Nishi et al. ................ 428/36.9 |
| 6,245,183 | B1 | * | 6/2001 | Iorio et al. ............. 156/244.14 |
| 6,294,644 | B1 | * | 9/2001 | Isobe et al. ................. 528/310 |

FOREIGN PATENT DOCUMENTS

| EP | 0 650 987 A1 | 5/1995 |
| EP | 0 957 148 A1 | 11/1999 |
| EP | 1 086 962 A1 | 3/2001 |
| JP | 5-8353 A | 1/1993 |
| JP | 7-53823 A | 2/1995 |
| JP | 8-104807 A | 4/1996 |
| JP | 10-311461 |   | 11/1998 |
| WO | WO 96/03448 A1 | 2/1996 |
| WO | WO 97/28394 | * | 8/1997 |
| WO | WO 99/45044 A1 | 9/1999 |

OTHER PUBLICATIONS

English Translation of International Preliminary Examination Report for PCT/JP01/02366 Dated Jan. 23, 2002.

* cited by examiner

*Primary Examiner*—Mark Eashoo
(74) *Attorney, Agent, or Firm*—Sughrue Mion, PLLC

(57) ABSTRACT

The present invention is to provide a method of producing multilayer laminates comprising a polyamide and a fluorine-containing ethylenic polymer laminated together and being excellent in interlayer adhesion strength by multilayer coextrusion in an easy and simple manner without need of any additional step or without being limited to some or other particular adhesive material.

The present invention is a production method of a multilayer laminate which comprises laminating at least a polyamide (A) and a fluorine-containing ethylenic polymer (B) by simultaneous multilayer coextrusion using a coextrusion apparatus to obtain the laminate comprising said polyamide (A) and said fluorine-containing ethylenic polymer (B), said coextrusion apparatus comprising a die and a plurality of extruders for feeding resins to said die, and the temperature of said die being set within the range exceeding 260° C. but not higher than 310° C.

16 Claims, No Drawings

PROCESS FOR PRODUCING MULTILAYERED PRODUCT

TECHNICAL FIELD

The present invention relates to a production method of multilayer laminates which comprises laminating a polyamide and a fluorine-containing ethylenic polymer by simultaneous multilayer coextrusion.

BACKGROUND ART

Multilayer laminates formed by laminating a polyamide and a fluorine-containing resin are expected as composite materials having polyamide characteristics, such as high strength, high toughness, light weight, good processability and in particular, flexibility, as well as fluorine-containing resin characteristics, such as heat resistance, oil and chemical resistance, and low liquid agent permeability.

The successive lamination method and simultaneous lamination method are known for producing such multilayer laminates. Among them, the simultaneous lamination method, especially coextrusion method holds an important position because of its merit lying in that the number of steps required for obtaining the laminate can be lowered. The simultaneous multilayer coextrusion method is applied to multilayer molding or multilayer film formation using two or more extruders and, currently, films, sheets, extruded molded articles called profiles, pipes, hoses, tubes and other moldings varied in shape or form are being produced by the method. The method is applicable to various thermoplastic resins, such as polyamides, as well as to fluorine-containing resins.

However, fluorine-containing resins are characterized in that they are low in intermolecular cohesive force and very low in surface free energy because of the low polarizability of fluorine-containing molecules. Therefore, they can hardly be wet against solids higher in intermolecular cohesive force, hence they show low adhesive properties against most of other substances. They, as resins, are thus characteristically poor in adhesion properties and their interlayer adhesiveness with polyamides is low; it is therefore necessary to contrive to increase the interlayer adhesion strength. For example, methods are known which comprise subjecting the surface of the fluorine-containing resin to surface treatment such as corona discharge treatment or irradiation treatment. Japanese Kokai Publication Hei-05-8353, for instance, proposes a method of producing multilayer tubes comprising a polyamide resin as an outer layer and a fluorine-containing resin as an inner layer by irradiating the tubes to introduce intermolecular crosslinking structures among molecules in both layers and thereby secure the adhesion strength between the polyamide resin layer and the fluorine-containing resin layer. However, the method cannot be applied to the simultaneous lamination technique including coextrusion.

Also available is a technology according to which a polymer blend comprising a fluorine-containing resin is used for the resin layer to be adhered to a polyamide. As a production method using this technology, Japanese Kokai Publication Hei-07-53823 discloses a method of producing multilayer tubes comprising an outer layer comprising a polyamide and an inner layer comprising a fluorine-containing resin in which a resin composition comprising both a specific polyamide and a fluorine-containing resin is laminated to a polyamide layer so that it may serve as an adhesive layer with the inner layer. In this production method, however, the morphology of the adhesive layer changes according to the molding conditions due to the intrinsically poor compatibility between the constituent resins of the adhesive layer, namely the polyamide and fluorine-containing resin, and the morphology change influences on the cohesive force of the adhesive layer itself and the adhesion strength thereof with the other layers. Thus, such problems arise as a tendency toward variation in adhesion strength according to environmental factors such as molding conditions and temperature conditions during use and difficulty in securing a constant quality level. Furthermore, this technology does not intend to increase the adhesiveness of the polyamide and fluorine-containing resin themselves but merely utilizing the adhesiveness of the polymer blend. In addition, the use of such polymer blend in lieu of the fluorine-containing resin results in an impairment in those excellent characteristics of the fluorine-containing resin.

To solve this problem, attempts have been made to improve the fluorine-containing resin itself, and various fluorine-containing resin materials have been proposed. For example, in the WO 99/45044 pamphlet, there is disclosed a method of multilayer simultaneous extrusion of laminates which comprises polyamide 12 (nylon 12) as an outer layer and a fluorine-containing ethylenic polymer having carbonyl groups, such as carbonate groups and/or carbonyl halide groups, as an inner layer fluorine-containing resin to be laminated to the outer layer. In this method, the die temperature is set at 260° C., and an interlayer adhesion strength of ten and several of N/cm and a good appearance can be obtained. However, such a level of adhesion strength is not fully sufficient in some fields of application.

Thus, in the art, the efforts to develop production technologies of improving the performance characteristics of multilayer laminates comprising a polyamide and a fluorine-containing resin, in particular a fluorine-containing ethylenic polymer, can be said to have been principally directed to two aspects, namely investigations concerning the method of physical treatment of the adhesive surface and contrivances for adhesive materials, as mentioned above. There is no production method known, however, for attaining sufficiently high interlayer adhesion strength without requiring an additional step or steps and without being restricted to a specific adhesive material, in particular for attaining high productivity by applying the simultaneous multilayer coextrusion technique.

SUMMARY OF THE INVENTION

In view of the above-mentioned state of the art, it is an object of the present invention to provide a production method of multilayer laminates comprising a polyamide and a fluorine-containing ethylenic polymer laminated together and being excellent in interlayer adhesion strength by multilayer coextrusion in an easy and simple manner without need of any additional step or without being limited to use of some or other particular adhesive material.

In those multilayer laminates comprising a polyamide and a fluorine-containing resin laminated together which are in the form of films, sheets, hoses or tubes etc., hence are required to have flexibility, polyamides having a relatively low melting point, in particular nylon 11 and nylon 12, are generally used among others. If, in this case, the molding temperatures in multilayer coextrusion, namely the cylinder temperature and die temperature, are selected at levels much higher than the melting points of the resins, the melt viscosity of the resin will become too low, hence molding will become difficult to carry out. The possibility of resin degradation will also arise. Therefore, in the molding technology field, the molding temperatures are selected at levels which these problems no no more arise. Thus, the die temperature in extrusion molding of nylon 11 or nylon 12 as so far employed is within the range of 240 to 250° C. and, even in lamination with a fluorine-containing resin, a temperature range exceeding 260° C. has never been employed as the die temperature in molding nylon 11 or nylon 12, as described in the above-cited WO 99/45044 pamphlet.

However, as a result of intensive investigations concerning the influences of various multilayer molding conditions in order to accomplish the above object, the present inventors unexpectedly found that when a die temperature in a specific range exceeding the temperature range conventionally employed is used for lamination by simultaneous multilayer coextrusion, the above object can be accomplished and, based on this finding, they have now completed the present invention.

Thus, the present invention relates to a production method of a multilayer laminate which comprises laminating at least a polyamide (A) and a fluorine-containing ethylenic polymer (B) by simultaneous multilayer coextrusion using a coextrusion apparatus to obtain the laminate comprising said polyamide (A) and said fluorine-containing ethylenic polymer (B), said coextrusion apparatus comprising a die and a plurality of extruders for feeding resins to the die, and the temperature of said die being set within the range exceeding 260° C., preferably not lower than 265° C., more preferably not lower than 270° C., but not higher than 310° C., preferably not higher than 300° C., more preferably not higher than 290° C.

In accordance with a preferred embodiment of the invention, the temperature of a feed block, in case that the feed block is connected to the die, is also set within the range, namely above 260° C. but not higher than 310° C.

In a preferred embodiment of the invention, a cylinder temperature of the extruder for feeding the polyamide (A) to said die is set at a level higher by 20 to 90° C. than the melting point of the polyamide (A), or the temperature of the polyamide (A) at a resin inlet, connected to the extruder, of the die, or of the feed block, in case that the feed block is connected to the die, is set at a level higher by 20 to 90° C. than the melting point of the polyamide (A).

In a preferred embodiment of the invention, the above polyamide (A) is nylon 11 or nylon 12.

In a preferred embodiment of the invention, the fluorine-containing ethylenic polymer (B) is a fluorine-containing ethylenic polymer having carbonyl group with a carbonyl group content of 3 to 1,000 groups, in total, per $1 \times 10^6$ main chain carbon atoms.

In a preferred embodiment of the invention, the simultaneous multilayer coextrusion is carried out by a technique selected from the group consisting of a multilayer film coextrusion, multilayer sheet coextrusion, multilayer blow coextrusion, multilayer profile coextrusion, multilayer pipe coextrusion, multilayer tube coextrusion, multilayer wire coating coextrusion and multilayer steel pipe coating coextrusion techniques.

In a preferred embodiment of the invention, the above simultaneous multilayer coextrusion technique is carried out by a technique selected from the group consisting of a lamination technique in front of the die, a lamination technique within the die and a lamination technique behind the die, in which resins to be coextruded are joined for multilayer formation in front of the die, within the die and behind the die, respectively. The above die may be a flat die or a circular die, preferably a circular die in which resin spreading is effected by a type selected from the group consisting of spider, crosshead and spiral types.

The present invention also relates to an automotive fuel piping tube or hose each having an at least three-layer structure comprising, as an outer layer, a layer comprising a polyamide (A); as an intermediate layer, a layer comprising a fluorine-containing ethylenic polymer (B); and, as an inner layer, a layer (C) comprising a fluorine-containing resin and containing or not containing an electrically conductive material, said fluorine-containing resin having a melting point not lower than 250° C.

The present invention further relates to an automotive fuel piping tube or hose each having an at least four-layer structure comprising, as an outer layer, a layer comprising a polyamide (A); as an intermediate layer, a layer comprising a fluorine-containing ethylenic polymer (B); a layer (C) comprising a fluorine-containing resin and not containing an electrically conductive material; and, as an innermost layer, a layer (D) comprising a fluorine-containing resin and containing an electrically conductive material, wherein at least one of the fluorine-containing resin of the layer (C) and the fluorine-containing resin of the layer (D) has a melting point not lower than 250° C.

DETAILED DISCLOSURE OF THE INVENTION

In the following, the present invention is described in detail.

In carrying out simultaneous multilayer coextrusion according to the production method of the invention, a coextrusion apparatus comprising a die and a plurality of extruders respectively feeding, to the die, at least a polyamide (A) and a fluorine-containing ethylenic polymer (B), where necessary together with another resin or other resins is used. In the following, this apparatus is first described in detail.

Coextrusion Apparatus

Industrially, the above-mentioned simultaneous multilayer coextrusion is carried out using a coextrusion apparatus having a constitution comprising a die and a plurality of extruders feeding resins mentioned above to the die. Generally, the coextrusion apparatus may have a constitution comprising a plurality of extruders to be described below in detail which feed the above-mentioned raw material resins to the die, the die, a cooling apparatus for cooling and shaping (sizing) the resins that have passed through the die(s), a treatment system disposed when necessary for corona treatment, flame treatment, ozone treatment and/or the like, and a take-up unit of a molded article.

1. Extruders

As the above extruders, the plurality of extruders is generally disposed for feeding the raw material resins for forming the respective layers, and the number thereof is equal to the number of the constituent layers. However, it is not always necessary for the number of extruders to be equal to the number of the constituent layers. Any known constitution capable of feeding the specified resins to each die can be employed. The fundamental structure of the extruder is not particularly restricted but preferably is of the screw type. The screw extruder generally comprises an adapter (connecting part between the extruder and die), screw, cylinder, hopper, and cylinder temperature control unit. The above screw extruder may be a single-screw extruder or a twin-screw extruder. Generally, a single-screw extruder is used. The extruder may be provided with a vent hole so that the volatile substances generated from the resin may be excluded upon opening the vent hole or reducing the pressure through it. The respective raw material resins sufficiently melted in the extruders are then fed to a die, or to the so-called feed block when such block is connected to the die for joining resins to be coextruded for multilayer formation in front of the die. Therefore, the raw material resins are fed to the die from the extruders via the adapter, or via the feed block from the adaptor when the feed block is connected to the die. The resins may also be fed from the extruder to the die or feed block via a gear pump in order to maintain the extrusion output at a constant level and thereby control the thickness of molded articles more precisely.

2. Die

The die may appropriately be selected according to the application use. For example, a flat die or a circular die (for inflation films) may be used in molding multilayer films or sheets, a pipe or tube die (circular die) in molding multilayer pipes or tubes, a blow die in multilayer blow molding, a profile die in multilayer profile molding, a wire coating die in molding multilayer wire coatings, or a pipe coating die in molding multilayer steel pipe coatings.

When a molten resin is fed to this die, the resin is spread in the flow channel within the die. The manner of spreading may be, for example, by the spider method, by the cross head method enabling extrusion in a direction 90° to the extruder, or by the spiral method. Among these, the spiral method is preferred since a uniform layer thickness can be obtained thereby.

The length of the flat portion of a die mandrel of the circular die can appropriately be selected and may be about 50 to 200 mm, for instance.

Meanwhile, in carrying out simultaneous multilayer coextrusion, it is necessary to join the respective resin layers constituting multilayer in a coextrusion apparatus for multilayer formation. The position of joining the resin layers fed from the respective extruders for multilayer formation is preferably within the die but may be any or a combination of the modes mentioned below.

i) Lamination technique in front of the die which comprises joining the resins before their entering the die in a block called feed block (also called combining adapter): In this technique, a block called feed block is disposed on the side upstream of the die (single manifold die). The raw material resins constituting respective layers are first fed from the respective extruders to this block and, after joining for lamination, they are fed from the feed block to the die.

ii) Lamination technique within the die which comprises joining the resins within the die for multilayer formation: In this technique, the respective layer-constituting raw material resins are fed from the respective extruders to a die (multi-manifold die) having a plurality of resin wells called manifold and caused to join immediately upstream of the so-called lip within the die for multilayer formation.

iii) Lamination technique behind the die: In this technique, a die (dual slot die) having a plurality of separated flow channels is used. The raw material resins constituting respective layers are fed from the respective extruders and passed through the die each in a separated state and, thereafter, they are joined for multilayer formation.

In the production method according to the invention, the temperature of the above die is set at a level within the range of above 260° C., preferably not lower than 265° C., more preferably not lower than 270° C., but not higher than 310° C., preferably not higher than 300° C., more preferably not higher than 290° C. Therefore, it may appropriately be set at 265 to 300° C., more preferably 270 to 290° C. At a die temperature below 260° C., it is impossible to obtain sufficiently high interlayer adhesion strength and, at above 310° C., the resins undergo marked thermal degradation and the multilayer laminates obtained thus show decreased strength and elongation and a poor appearance. Thus, the temperature is limited within the above range.

When a feed block is connected to the die (the above mode i), it is preferred that not only the die temperature but also the temperature of the feed block be set at a level within the range of above 260° C., preferably not lower than 265° C., more preferably not lower than 270° C., but not higher than 310° C., preferably not higher than 300° C., more preferably not higher than 290° C. In this case, it is preferred that the die and feed block should be at the same temperature.

In the production method according to the invention, it is preferred that the cylinder temperature of the extruder for feeding the polyamide (A) to the above die be higher by 20 to 90° C. than the melting point of the polyamide (A) or that the temperature of the polyamide (A) at the resin inlet (adapter section), which is connected to the extruder, of the die (the above mode ii or iii) or of the feed block (the above mode i) in case that the feed block is connected to the die, be higher by 20 to 90° C. than the melting point of the polyamide (A). At lower temperatures than this temperature, no good moldings may possibly be obtained due to insufficient melting of the resin and, at higher temperatures than this temperature, the resin may possibly undergo thermal degradation and the tensile strength and elongation of the moldings, such as tubes, may decrease in some instances. More preferably, the temperature in question is set at a level higher by 30 to 80° C. than the melting point of the polyamide (A). In this case, the difference between the cylinder temperature and the above die temperature is relatively small, so that there is no possibility of its causing a marked increase in resin pressure in the die.

Now, the polyamide (A) and fluorine-containing ethylene polymer (B) to be used in the practice of the invention are described in detail.

Polyamide (A)

The polyamide so referred to herein means a crystalline macromolecule having the amide bond —NH—CO— in a repeating unit within the molecule. As such, there may be mentioned, for example, the so-called nylon resins, namely resins in which a majority of amide bonds are bound to an aliphatic or alicyclic structure. Specifically, there may be mentioned, for example, nylon 6, nylon 66, nylon 11, nylon 12, nylon 610, nylon 612, nylon 46, metaxylylenediamine/adipic acid polymers, nylon 6/66 copolymers, and nylon 66/12 copolymers, and blends of these.

The polyamide to be used in the practice of the invention may have a structure having no amide bond in a repeating unit as partially occurring within the polyamide in a block or graft form. As such resin, there may be mentioned the polyamide elastomers such as nylon 6/polyester copolymers, nylon 6/polyether copolymers, nylon 12/polyester copolymers and nylon 12/polyether copolymers. These polyamide elastomers are block copolymers resulting from copolymerization of nylon resin oligomers and polyester resin oligomers or polyether resin oligomers by forming ester bonding or ether bonding. The above polyester resin oligomers include, for example, polycaprolactone and polyethylene adipate, and the polyether resin oligomers include, for example, polyethylene glycol, polypropylene glycol and polytetramethylene glycol. Particularly preferred embodiments are nylon 6/polytetramethylene glycol copolymers and nylon 12/polytetramethylene glycol copolymers.

In the practice of the present invention, the polyamide is preferably selected from among appropriate species having a melting point of not lower than 130° C., more preferably not lower than 150° C. When the melting point is lower than 130° C., the layer formed therefrom may be poor in mechanical properties, heat resistance or the like.

For use in the practice of the invention, the polyamide preferably has a relative viscosity which indicates a molecular weight of not less than 1.8, more preferably not less than 2.0. When it is less than 1.8, the resin may show poor moldability, giving moldings inferior in mechanical properties. On the other hand, the upper limit is preferably not more than 4.0. If it exceeds 4.0, the polymerization of the resin itself is difficult and, even if the resin is obtained, the resin may be poor in moldability. The above-mentioned relative viscosity is determined as described in JIS K 6810.

Usable as the polyamide in the practice of the invention is any of nylon 11, nylon 12, nylon 610, nylon 612, a nylon 6/polyether copolymer or a nylon 12/polyether copolymer in the case of producing tube or hose moldings, which are required to have toughness. When the moldings are expected to be used in automotive fuel piping, nylon 11 and nylon 12 are more preferred among others in view of the occurrence of zinc chloride water sprinkled over roads as a snow melting agent.

In the practice of the invention, the above polyamide may contain, in addition to the amide group, a functional group or groups selected from the group consisting of hydroxyl group, carboxyl group, ester group and sulfonamide group in a total amount of 0.05 to 80 equivalent percent relative to the amide group. When it contains one or more species among hydroxyl group, carboxyl group, ester group and sulfonamide group in a total amount such that the above condition relative to the amide groups may be satisfied, the initial characteristics of the interlayer adhesion strength with the fluorine-containing ethylenic polymer (B) can favorably be maintained over a prolonged period of time without those characteristics being impaired. Among the functional groups mentioned above, a sulfonamide group is preferred and it is particularly preferred that the polyamide contains a sulfonamide group or groups directly bound to an aromatic ring. The total content of the functional group(s) other than the amide group is preferably 1 to 70 equivalent percent, more preferably 1 to 50 equivalent percent, relative to the amide group.

Such a polyamide as mentioned above may be one resulting from copolymerizing a copolymerizable monomer having such a functional group or groups with the polyamide-based resin in such an amount that the above-mentioned content of the functional group(s) can be attained, or incorporating a plasticizer having at least one functional group species selected from the group consisting of hydroxyl group, carboxyl group, ester group and sulfonamide group or a macromolecule having such a functional group(s) and compatible with the polyamide so that the above-mentioned functional group content may be attained. The above-mentioned macromolecule having such a functional group(s) and compatible with the polyamide includes, for example, ester- and/or carboxylic acid-modified olefinic resins (ethylene/methyl acrylate copolymers, ethylene/acrylate copolymers, ethylene/methyl acrylate/maleic anhydride copolymers, ethylene/ethyl acrylate copolymers, propylene/maleic anhydride copolymers, etc.), ionomer resins, polyester resins, phenoxy resins, ethylene-propylene-diene copolymers, and polyphenylene oxide.

Among them, the method comprising incorporating a plasticizer is advantageous in that not only the desired amount of the above-mentioned functional group(s) can be incorporated at a relatively low addition level but also the effects intrinsic in the plasticizer can be shown in rendering the resin composition flexible and improving the cold temperature mechanical properties of tubes or hoses, in particular. In this case, the addition level may vary depending on the plasticizer species. Generally, however, the above functional group content can be attained at an addition level of about 5 to 20% by weight relative to the whole amount of the composition.

As such plasticizers, there may be mentioned, for example, alcoholic hydroxyl group-containing compounds such as hexylene glycol and glycerol; phenolic hydroxyl group-containing compounds such as β-naphthol, dibenzylphenol, octylcresol, bisphenol A and like bisphenol compounds, octyl p-hydroxybenzoate, 2-ethylhexyl p-hydroxybenzoate and heptyl p-hydroxybenzoate; carboxyl group-containing compounds such as p-hydroxybenzoic acid-ethylene oxide and/or propylene oxide adducts; ester group-containing compounds such as octyl p-hydroxybenzoate, 2-ethylhexyl p-hydroxybenzoate, heptyl p-hydroxybenzoate and like benzoic acid esters and, further, ε-caprolactone, phosphate esters of phenolic compounds, and the like; and sulfonamide group-containing compounds such as N-methylbenzenesulfonamide, N-ethylbenzenesulfonamide, N-butylbenzenesulfonamide, toluenesulfonamide, N-ethyltoluenesulfonamide and N-cyclohexyltoluenesulfonamide.

In this case, the amine value of the polyamide in which the plasticizer is incorporated is not particularly restricted. In the case of ordinary polyamides, the value is generally less than 10 equivalents/$10^6$ g, and such polyamides can be used. Polyamides having greater amine values, for example within the range of 10 to 60 equivalents/$10^6$ g, can also be used. Meanwhile, from the viewpoint of molecular weight or adhesion strength, the polyamide preferably has an acid value not higher than 80 equivalents/$10^6$ g.

In the practice of the present invention, the polyamide may contain another resin, a colorant and/or one or more of various additives unless the object of the invention is deteriorated. As the additives, there may be mentioned, for example, antistatic agents, flame retardants, heat stabilizers, ultraviolet absorbers, lubricants mold-release agents, nucleating agents, and reinforcing agents (fillers).

Fluorine-containing Ethylenic Polymer (B)

The fluorine-containing ethylenic polymer according to the invention may comprise a homopolymer chain or copolymer chain having the repeating unit derived from at least one fluorine-containing ethylenic monomer species, and the polymer chain may be one resulting from polymerization of a fluorine-containing ethylenic monomer or monomers alone or from polymerization of a fluorine-containing ethylenic monomer or monomers and a fluorine atom-free ethylenic monomer or monomers.

The above-described fluorine-containing ethylenic monomer is a fluorine atom-containing, olefinically unsaturated monomer and specifically includes tetrafluoroethylene, vinylidene fluoride, chlorotrifluoroethylene, vinyl fluoride, hexafluoropropylene, hexafluoroisobutene, monomers represented by the formula (ii):

$$CH_2=CX^1(CF_2)_nX^2 \tag{ii}$$

in the formula, $X^1$ is H or F, $X^2$ is H, F or Cl and n is an integer of 1 to 10, perfluoro(alkyl vinyl ether) compounds and the like.

The above-described fluorine atom-free ethylenic monomer is preferably selected from among ethylenic monomers containing not more than 5 carbon atoms so that the heat resistance, chemical resistance and like characteristics may not be reduced. Specifically, there may be mentioned ethylene, propylene, 1-butene, 2-butene, vinyl chloride, vinylidene chloride, etc.

In cases where a fluorine-containing ethylenic monomer(s) and a fluorine atom-free ethylenic monomer(s) are used, the monomer composition may have a ratio of 10 to 100 mole percent (e.g. 30 to 100 mole percent) of the fluorine-containing ethylenic monomer(s) to 90 to 0 mole percent (e.g. 70 to 0 mole percent) of the fluorine atom-free ethylenic monomer(s).

By selecting the fluorine-containing ethylenic monomer species and fluorine atom-free ethylenic monomer species, and the combination and composition ratio thereof, the melting point or glass transition point of the fluorine-containing ethylenic polymer according to the invention can be adjusted and the polymer may be either resin-like or elastomer-like. The form and properties of the fluorine-containing ethylenic polymer can appropriately be selected according to the performance characteristics required of and the application field of the multilayer laminate. It is preferred, among others, that the polymer has a melting point of 150 to 270° C. Such polymer can fully show the adhesion properties of its carbonyl groups and can advantageously provide firm adhesion strength when laminated directly together with the other material. For enabling lamination also with an organic material having relatively low heat resistance, the melting point is more preferably not higher than 230° C., still more preferably not higher than 210° C.

As for the molecular weight of the fluorine-containing ethylenic polymer to be used according to the invention, it is preferably within such a range that the polymer can be molded at temperatures below the heat decomposition point and that the moldings obtained can display those excellent mechanical properties, chemical resistance and other properties which are intrinsic in the fluorine-containing ethylenic polymer. More specifically, when the melt flow rate (MFR) is taken as an index of molecular weight, the MFR at an arbitrary temperature within the range of about 230 to 300° C. is preferably 0.5 to 100 g/10 minutes.

Preferred as the fluorine-containing ethylenic polymer according to the invention is a fluorine-containing ethylenic polymer comprising the tetrafluoroethylene unit from the viewpoint of heat resistance and chemical resistance, or, from the viewpoint of moldability/workability, a fluorine-containing ethylenic copolymer comprising the vinylidene fluoride unit.

As preferred typical examples of the fluorine-containing ethylenic polymer according to the invention, there may be mentioned fluorine-containing ethylenic copolymers (I) to (V) whose fluorine-containing ethylenic polymer chain is a polymer chain essentially resulting from polymerization of the monomers mentioned below:

(I) copolymers resulting from polymerization at least of 5 to 95 mole percent of tetrafluoroethylene and 95 to 5 mole percent of ethylene;

(II) copolymers resulting from polymerization at least of 3 to 97 mole percent of tetrafluoroethylene and 97 to 3 mole percent of a compound represented by the general formula:

CF$_2$=CF—Rf$^1$

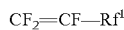

in the formula, Rf$^1$ represents CF$_3$ or ORf$^2$ and Rf$^2$ represents a perfluoroalkyl group having 1 to 5 carbon atoms;

(III) copolymers resulting from polymerization at least of the following a, b and c:
a. 20 to 90 mole percent, preferably 20 to 70 mole percent, of tetrafluoroethylene;
b. 10 to 80 mole percent, preferably 20 to 60 mole percent, of ethylene; and
c. 1 to 70 mole percent, preferably 1 to 60 mole percent, of a compound represented by the general formula:

CF$_2$=CF—Rf$^1$

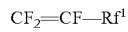

in the formula, Rf$^1$ represents CF$_3$ or ORf$^2$ and Rf$^2$ represents a perfluoroalkyl group having 1 to 5 carbon atoms;

(IV) copolymers resulting from polymerization of at least vinylidene fluoride; and (V) copolymers resulting from polymerization at least of the following d, e and f:
d. 15 to 60 mole percent of vinylidene fluoride;
e. 35 to 80 mole percent of tetrafluoroethylene; and
f. 5 to 30 mole percent of hexafluoropropylene.

The fluorine-containing ethylenic polymers specifically mentioned above are all preferred in view of their good heat resistance, chemical resistance, weathering resistance, and electrical insulating and non-stick properties.

As the copolymers (I) mentioned above, there may more specifically be mentioned, for example, copolymers comprising 20 to 90 mole percent (e.g. 20 to 60 mole percent) of the tetrafluoroethylene unit, 10 to 80 mole percent (e.g. 20 to 60 mole percent) of the ethylene unit and 0 to 70 mole percent of the unit derived from a monomer copolymerizable with these.

The copolymerizable monomer mentioned above includes hexafluoropropylene, chlorotrifluoroethylene, monomers represented by the formula (ii):

$$CH_2=CX^1(CF_2)_nX^2 \qquad (ii)$$

in the formula, X$^1$ is H or F, X$^2$ is H, F or Cl and n is an integer of 1 to 10, perfluoro(alkyl vinyl ether) compounds, propylene and the like. One or more of these are generally used.

Such fluorine-containing ethylenic polymers are preferred because of their good heat resistance, chemical resistance, weathering resistance, and electrical insulating and non-stick properties, in particular.

Preferred among these are the following:

(I-1) copolymers comprising 62 to 80 mole percent of the tetrafluoroethylene unit, 20 to 38 mole percent of the ethylene unit and 0 to 10 mole percent of the unit derived from another monomer; and (I-2) copolymers comprising 20 to 80 mole percent of the tetrafluoroethylene unit, 10 to 80 mole percent of the ethylene unit, 0 to 30 mole percent of the hexafluoropropylene unit and 0 to 10 mole percent of the unit derived from another monomer.

These copolymers retain the excellent performance characteristics of tetrafluoroethylene/ethylene copolymers, can have a relatively low melting point and can maximally display their adhesiveness to other materials, hence are preferred.

Preferred as the above-mentioned copolymer (II) are, for example, (II-1) copolymers comprising 65 to 95 mole percent, preferably 75 to 95 mole percent, of the tetrafluoroethylene unit and 5 to 35 mole percent, preferably 5 to 25 mole percent, of the hexafluoropropylene unit;

(II-2) copolymers comprising 70 to 97 mole percent of the tetrafluoroethylene unit and 3 to 30 mole percent of the $CF_2=CF—ORf^2$ unit ($Rf^2$ being a perfluoroalkyl group having 1 to 5 carbon atoms); and (II-3) copolymers comprising the tetrafluoroethylene unit, hexafluoropropylene unit and $CF_2=CF—ORf^2$ unit ($Rf^2$ being as defined above), in which the hexafluoropropylene unit and $CF_2=CF—ORf^2$ unit account for 5 to 30 mole percent in total.

The above (II-1) to (II-3) are the perfluoro type copolymers and are most excellent in heat resistance, chemical resistance, water repellency, and non-stick, electric insulating and other properties, among fluorine-containing ethylenic polymers.

As the above-mentioned copolymers (IV), there may be mentioned, for example, copolymers comprising 15 to 99 mole percent of the vinylidene fluoride unit, 0 to 80 mole percent of the tetrafluoroethylene unit and 0 to 30 mole percent of the unit derived from at least one of hexafluoropropylene and chlorotrifluoroethylene.

More specifically, there may be mentioned, for example, the following:

(IV-1) copolymers comprising 30 to 99 mole percent of the vinylidene fluoride unit and 1 to 70 mole percent of the tetrafluoroethylene unit;

(IV-2) copolymers comprising 60 to 90 mole percent of the vinylidene fluoride unit, 0 to 30 mole percent of the tetrafluoroethylene unit and 1 to 20 mole percent of the chlorotrifluoroethylene unit;

(IV-3) copolymers comprising 60 to 99 mole percent of the vinylidene fluoride unit, 0 to 30 mole percent of the tetrafluoroethylene unit and 5 to 30 mole percent of the hexafluoropropylene unit; and (IV-4) copolymers comprising 15 to 60 mole percent of the vinylidene fluoride unit, 35 to 80 mole percent of the tetrafluoroethylene unit and 5 to 30 mole percent of the hexafluoropropylene unit.

In the practice of the invention, it is particularly preferred that the fluorine-containing ethylenic polymer contains a carbonyl group(s) so that its adhesiveness to the layer comprising the polyamide (A) may become more firm and strong.

The term "carbonyl group" as used herein means a functional group having $—C(=O)—$ essentially reactive with such functional groups as amide group and amino group in the above-mentioned polyamide (A). More specifically, it includes carbonate, carbonyl halide, aldehyde, ketone, carboxyl, ester, acid anhydride, isocyanate and the like. On the contrary, amide, imide, urethane, urea and the like, in spite of their having $—C(=O)—$, are poor in reactivity as compared with the carbonate group and other functional groups mentioned above, hence may be said to be essentially incapable of reacting with the functional groups in the above-mentioned polyamide (A). Preferred as the carbonyl group in the practice of the invention are carbonate group, carbonyl halide group and carboxyl group, which can be introduced with ease and are highly reactive with the polyamide (A).

The number of carbonyl groups in the fluorine-containing ethylenic polymer according to the invention may appropriately be selected according to the other material to be laminated, the shape, the application field of the multilayer laminate, the adhesion strength required, the form of said polymer, etc. It is preferred, however, that the number of carbonyl groups should be 3 to 1,000, in total, per $1\times10^6$ main chain carbon atoms. When the number of carbonyl groups per $1\times10^6$ main chain carbon atoms is less than 3, a sufficient adhesion strength may not be attained. When it exceeds 1,000, the adhesion strength may be reduced as a result of chemical modification of the carbonyl groups in the step of adhesion. More preferably, the number is 3 to 500, still more preferably 10 to 300. The carbonyl group content in the fluorine-containing ethylenic polymer can be determined by infrared absorption spectrophotometry.

Where 20 or more carbonyl halide groups, which are particularly excellent in reactivity with the polyamide (A), are present in the fluorine-containing ethylenic polymer per $1\times10^6$ main chain carbon atoms, good adhesion to the polyamide (A) can be attained even when the total carbonyl group content is less than 150 per $1\times10^6$ main chain carbon atoms.

When the fluorine-containing ethylenic polymer described above is heated, for instance, in the step of molding, or with the lapse of time, the carbonyl halide groups may be decomposed to form carboxylic acid. Therefore, the fluorine-containing ethylenic polymer in the multilayer laminate generally contains not only the above-mentioned carbonate groups and/or carbonyl halide groups but also carboxyl groups derived from the carbonyl halide groups when these are contained.

The carbonate groups in the fluorine-containing ethylenic polymer according to the invention are groups generally having the bonding $—OC(=O)O—$ and specifically have a structure of $—OC(=O)O—R$ [wherein R is an organic group (e.g. $C_1–C_{20}$ alkyl group (in particular $C_1–C_{10}$ alkyl group), an ether bond-containing $C_2–C_{20}$ alkyl group or the like) or a group VII element]. As preferred examples of the carbonate group, there may be mentioned $—OC(=O)OCH_3$, $—OC(=O)OC_3H_7$, $—OC(=O)OC_8H_{17}$, $—OC(=O)OCH_2CH_2OCH_2CH_3$ and the like.

The carbonyl halide groups in the fluorine-containing ethylenic polymer according to the invention specifically have a structure of $—COY$ [Y being a halogen element], and examples are $—COF$ and $—COCl$.

The fluorine-containing ethylenic polymer having such carbonyl groups itself can retain those excellent characteristics which fluorine-containing materials have, such as chemical resistance, liquid agent resistance, weathering resistance, and antifouling and non-stick properties, and can provide the molded laminate with such excellent characteristics of fluorine-containing materials without deterioration thereof.

In the case where the fluorine-containing ethylenic polymer according to the invention contains carbonyl groups within the polymer chain, the mode in which the carbonyl groups are contained in the polymer chain is not particularly restricted but, for example, carbonyl groups may be bound to the polymer chain termini or side chains.

Among them, carbonyl groups occurring at polymer chain termini are preferred since they will not markedly reduce the heat resistance, mechanical properties and chemical resistance or since they are advantageous from the viewpoint of productivity and cost. A method of introducing carbonyl groups into polymer chain termini using a polymerization initiator having a carbonyl group(s) or a functional group(s) convertible to a carbonyl group(s), for example a peroxy carbonate or peroxy ester is preferred embodiment since introduction can be realized very easily and the content of carbonyl groups introduced can be controlled with ease. The carbonyl group derived from a peroxide so referred to herein means a carbonyl group directly or indirectly derived from a functional group contained in a peroxide.

Even when a fluorine-containing ethylenic polymer having no carbonyl groups is contained in the fluorine-containing ethylenic polymer according to the invention, the only requirement is that the total number of carbonyl groups per $1 \times 10^6$ main chain carbon atoms on the whole polymer basis should be within the range described above.

The production method of the fluorine-containing ethylenic polymer according to the invention is not particularly restricted but may comprise subjecting the monomer or monomers corresponding to the desired fluorine-containing polymer in species and mixing ratio to radical polymerization or ionic polymerization.

As for the method of radical polymerization, the technique of suspension polymerization in an aqueous medium using a fluorine-containing solvent and, as polymerization initiator, a peroxy carbonate or the like is preferred from the industrial viewpoint. However, other polymerization methods, for example solution polymerization, emulsion polymerization and bulk polymerization, can also be employed. In suspension polymerization, a fluorine-containing solvent may be used in addition to water. Usable as the fluorine-containing solvent in suspension polymerization are hydrochlorofluoroalkanes (e.g. $CH_3CClF_2$, $CH_3CCl_2F$, $CF_3CF_2CCl_2H$, $CF_2ClCF_2CFHCl$), chlorofluoroalkanes (e.g. $CF_2ClCFClCF_2CF_3$, $CF_3CFClCFClCF_3$), and perfluoroalkanes (e.g. perfluorocyclobutane, $CF_3CF_2CF_2CF_3$, $CF_3CF_2CF_2CF_2CF_3$, $CF_3CF_2CF_2CF_2CF_3$). Among them, perfluoroalkanes are preferred. In view of the suspensibility and economy, the fluorine-containing solvent is preferably used in an amount of 10 to 100% by weight relative to water.

The polymerization temperature is not particularly restricted but may be 0 to 100° C. The polymerization pressure is to be selected according to the species, amount and vapor pressure of the solvent employed, the polymerization temperature and other polymerization conditions. Generally, it may be 0 to 9.8 MPaG.

For molecular weight adjustment, conventional chain transfer agents can be used, for example hydrocarbons such as isopentane, n-pentane, n-hexane and cyclohexane; alcohols such as methanol and ethanol; and halogenated hydrocarbons such as carbon tetrachloride, chloroform, methylene chloride and methyl chloride.

As a method of obtaining the above-described fluorine-containing ethylenic polymer having the carbonyl group, there may be mentioned the method comprising subjecting a carbonyl group-containing monomer to copolymerization. As appropriate examples of the carbonyl group-containing ethylenic monomer, there may be mentioned fluorine-containing monomers such as perfluoroacryloyl fluoride, 1-fluoroacryloyl fluoride, acryloyl fluoride, 1-trifluoromethacryloyl fluoride and perfluorobutenoic acid and fluorine-free monomers such as acrylic acid, methacrylic acid, acryloyl chloride and vinylene carbonate. The polymer may also be obtained by subjecting a fluorine-containing ethylenic polymer, a grafting compound having a carbonyl group-containing functional group, and a radical generator such as a peroxide to grafting under melting and mixing at a temperature at which radical generation occurs in the extruder.

On the other hand, while various methods can be employed for producing fluorine-containing ethylenic polymers having a carbonyl group or groups at a polymer molecule terminus or termini, the method comprising using a peroxide, in particular a peroxy carbonate or a peroxy ester, as the polymerization initiator can preferably be employed from the economical viewpoint and the quality viewpoint, for example heat resistance and chemical resistance. By this method, it is possible to introduce, into a polymer chain terminus or termini, carbonyl groups derived from a peroxide, for example carbonate groups derived from a peroxy carbonate, ester groups derived from a peroxy ester, or carbonyl halide groups derived therefrom by functional group conversion. Among such polymerization initiators, peroxy carbonates can lower the polymerization temperature without involvement of side reactions in the initiation reaction, hence are preferably used.

Preferably used as the above peroxy carbonates are compounds represented by the following formulas (1) to (4):

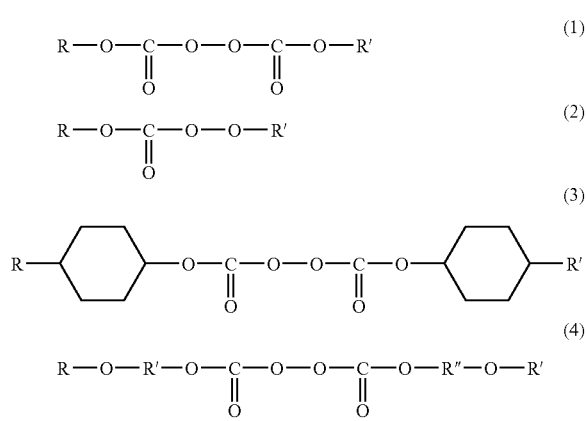

In the above formulas, R and R' each represents a straight or branched, saturated univalent hydrocarbon group having 1 to 15 carbon atoms or an alkoxy group-terminated, straight or branched, saturated univalent hydrocarbon group having 1 to 15 carbon atoms and R" represents a straight or branched, saturated divalent hydrocarbon group having 1 to 15 carbon atoms or an alkoxy group-terminated straight or branched, saturated divalent hydrocarbon group having 1 to 15 carbon atoms.

Particularly preferred among others are diisopropyl peroxydicarbonate, di-n-propyl peroxydicarbonate, tert-butylperoxy isopropyl carbonate, bis(4-tert-butylcyclohexyl) peroxydicarbonate, di-2-ethylhexyl peroxydicarbonate and the like.

The amount of the initiator to be used, for example a peroxy carbonate or a peroxy ester, may vary depending on the desired polymer species (e.g. composition), molecular weight, polymerization conditions and the initiator species employed. Generally, however, it is preferably 0.05 to 20 parts by weight, in particular 0.1 to 10 parts by weight, per 100 parts of the polymer to be obtained by the polymerization.

The terminal carbonate group or ester group content can be controlled not only by the use of such a polymerization initiator as a peroxy carbonate or peroxy ester but also by adjusting the polymerization conditions such as the amount of the chain transfer agent used and the polymerization temperature.

Various methods can be employed for obtaining fluorine-containing ethylenic polymers having a carbonyl halide group or groups at a polymer molecule terminus or termini. For example, such polymers can be obtained by heating, for causing thermal decomposition (decarboxylation) of the above-mentioned fluorine-containing ethylenic polymers having carbonate group(s) or ester group(s) at a terminus or termini, as mentioned above. The heating temperature depends on the carbonate group or ester group species and the fluorine-containing ethylenic polymer species. Preferably, heating is made so that the temperature of the polymer itself may reach 270° C. or above, preferably 280° C. or above, most preferably 300° C. or above. The upper limit to the heating temperature is preferably not higher than the thermal decomposition temperature of other sites than the carbonate group or ester group of the fluorine-containing ethylenic polymer and, more specifically, not higher than 400° C., more preferably not higher than 350° C.

The fluorine-containing ethylenic polymer according to the invention is preferably used alone so that the adhesiveness, heat resistance and chemical resistance, intrinsic in itself may not be impaired. According to the intended purpose and use, however, one or more of various fillers, such as inorganic powders, glass fiber, carbon fiber, metal oxides and carbon may be incorporated therein at levels which will not deteriorate the performance characteristics thereof. In addition to the fillers, one or more of pigments, ultraviolet absorbers and other optional additives may be formulated. It is also possible to incorporate, in addition to such additives, a resin, for example another fluororesin or a thermoplastic or thermosetting resin, a synthetic rubber or the like to thereby improve the mechanical properties and weathering resistance, provide decorativeness, prevent electrostatic charging, improve the moldability, and so on. In particular, incorporation of an electrically conductive material, such as carbon black or acetylene black, is of advantage in preventing electrostatic charge accumulation on such products as tubes and hoses in fuel piping systems, hence is preferred.

The layer comprising the fluorine-containing ethylenic polymer (B) according to the invention comprises the above-described fluorine-containing ethylenic polymer and another or other components incorporated according to need and, where necessary, the layer comprising the above fluorine-containing ethylenic polymer (B) may be electrically conductive. The term "electrically conductive" as used herein means that while electrostatic charge may accumulate upon continuous soaking of an insulating material such as a resin with an inflammable fluid such as gasoline, whereby the possibility of inflammation arises, the layer has an electrical property such that this electrostatic charge accumulation will not occur. It is provided in SAE J2260, for instance, that the surface resistivity should be not higher than $10^6$ $\Omega/\square$. For making the layer comprising the above (B) electrically conductive, the above-described electrically conductive material is incorporated preferably at a level not more than 20% by weight, more preferably not more than 15% by weight, in the composition constituting the above layer. The lower limit is such a level that can provide the surface resistivity described above.

In the practice of the present invention, the layer comprising the above fluorine-containing ethylenic polymer (B) may be further laminated to a layer (C) comprising a fluorine-containing resin. Where necessary, the above layer (C) comprising the fluorine-containing resin may contain an electrically conductive material for providing the laminate with electric conductivity. In this case, the level of addition of the electrically conductive material may be such that electric conductivity can be provided. Thus, the addition level may be as described above.

The above fluorine-containing resin is not particularly restricted but may be any melt-moldable fluorine-containing resin, including, for example, tetrafluoroethylene/fluoro (alkylvinyl ether) copolymers (PFA), tetrafluoroethylene/hexafluoropropylene copolymers (FEP), ethylene/tetrafluoroethylene copolymers (ETFE), polychlorotrifluoroethylene (PCTFE), ethylene/chlorotrifluoroethylene copolymers (ECTFE), polyvinyl fluoride (PVF) and polyvinylidene fluoride (PVDF). It may be the above-described fluorine-containing ethylenic polymer. The above fluorine-containing resin may have a melting point not lower than 260° C.

Among them, those having a melt flow rate of 0.5 to 100 g/10 minutes at an arbitrarily selected temperature between 230° C. and 300° C. are suited for use in producing multilayer laminates such as fuel piping tubes and hoses, etc., which retain a low level of liquid agent/fuel permeability and are excellent in flexibility, cold temperature impact resistance, heat resistance and so forth, by simultaneous multilayer coextrusion with the polyamide.

A special feature of the present invention is that a fluorine-containing resin having a relatively high melting point, namely a melting point of not lower than 250° C., can be used as the above-mentioned fluorine-containing resin. While, among the conditions of extruding fluorine-containing resins, including the above-described fluorine-containing ethylenic polymer (B), the die temperature alone is restricted, the melt flow in the die section can be secured by setting the cylinder temperature at a sufficiently high level, so that multilayer laminates having such a constitution can easily be produced by simultaneous multilayer coextrusion. Fluorine-containing resins having a high melting point are excellent in chemical resistance and have low level of liquid agent permeability in proportion to the melting point and can be used with great advantage, in particular, in those fields in which a high level of liquid agent impermeability is required, for example, for automotive fuel piping.

The fluorine-containing resin of the above (B) and the resin in the above layer (C) may be the same or different.

The present invention is also applicable to the production of multilayer laminates in which the layer comprising the above (B) is further laminated with a layer (A') comprising a polyamide in lieu of the layer (C) comprising the fluorine-containing resin. Where necessary, the layer (A') comprising the polyamide may contain an electrically conductive material for providing electric conductivity. In this case, the polyamide may be the same as or different from the above (A).

The present invention is further applicable to the production method of multilayer laminates in which the layer (C) comprising a fluorine-containing resin and not containing the electrically conductive material is further laminated with a layer (D) comprising a fluorine-containing resin and containing an electrically conductive material. In this case, the level of addition of the electrically conductive material may be such that electric conductivity can be provided. Thus, the addition level may be as mentioned above. Any of the fluorine-containing resins mentioned above may be used as the fluorine-containing resin constituting the layer (D), and the fluorine-containing resin may be the same as or different from the resin in the above layer (C), and it may have a melting point of not lower than 250° C.

The production method according to the present invention comprises laminating at least the above-described (A) and (B), where necessary together with the other layer(s) described above, one over the other in a adhered state using the above-described coextruding apparatus. On that occasion, the line speed of the laminate may be, for example, 4 to 20 m/minute. It is also possible to produce lined products by laminating the multilayer laminate molded by the production method of the invention with another substrate.

The draw down ratio, as expressed in terms of the ratio of the die opening area to the sectional area of the molded article actually obtained, is not particularly restricted. For improving the molding speed and preventing the occurrence of "melt fracture", which is a problem peculiar to fluorine-containing resins, it may be 4 to 9, for instance, and even a further higher draw down rate can be employed. In the case of a circular die, the draw ratio balance is preferably around 1.

In cases where the molded articles are complicated in shape or form or where the moldings are subjected to heating and bending after molding, it is also possible to mold the resins by melt extrusion to form a multilayer laminate and subject the thus-formed multilayer laminate to 0.01 to 10 hours of heat treatment at a temperature lower than the lowest melting point among the melting points of the resins constituting the above molding to thereby remove the residual strain in the molded articles. By employing this production method, it is possible to remove the residual strain, supposedly allow unreacted substances in the vicinity of the layer interface to react and thereby further increase the adhesion strength of the multilayer molding synergistically. Preferably, the above heat treatment is carried out at 60° C. or above, more preferably at 80° C. or above.

The multilayer laminate obtained by the production method of the present invention can have an initial interlayer adhesion strength between the layer comprising the polyamide (A) and the layer comprising the fluorine-containing ethylenic polymer (B) of not less than 30 N/cm or, further, not less than 40 N/cm, as shown later herein in the example section. Thus, very high and strong adhesion strength levels can be attained. Even when the fluorine-containing ethylenic polymer (B) contains no specific functional groups markedly contributing to the improvement in adhesion, the above effect is spectacular and, in this respect, the technology of the invention is clearly distinguishable from the prior art technologies.

In the practice of the invention, the layer comprising the fluorine-containing ethylenic polymer (B) may have a thickness less than 0.5 mm. When a layer better in liquid agent permeability resistance than the layer comprising the above (B) is used as the above-mentioned layer (C) or layer (D), the layer comprising the above (B) may be thin. As for the range, the layer comprising the above (B) may be less than 1.5 times the thickness of the layer (C) or, in case that the layer (D) is further laminated, less than 1.5 times the total thickness of the layer (C) and layer (D). In cases where the layer comprising the above (B) is to serve as an intermediate adhesive layer, it is therefore possible to reduce the thickness of the adhesive layer. This is economically advantageous.

The production method of the invention can appropriately be applied to the production of such multilayer laminates as listed below, for example:

tubes and hoses: automotive fuel piping tubes or hoses, automotive radiator hoses, brake hoses, air conditioner hoses, tubes or hoses for transporting liquid agents, and the like;

films and sheets: diaphragm pump diaphragms, various packing members and like sliding members required to have high chemical resistance, and the like;

tanks: automotive radiator tanks, liquid agent storage bottles or bags, containers for chemicals, gasoline tanks, and the like;

electric wires and cables and pipes: coated wires and cables, coated steel tubes, and the like;

others: carburetor flange gaskets, fuel pump O rings, like various automotive seals, seals in the chemical industry such as seals in chemical pumps and flow meters, seals in the machinery industry such as hydraulic instrument seals, and the like.

Among them, preferred embodiments are, for example, as follows:

(i) tubes or hoses, in particular automotive fuel piping or liquid agent transporting tubes or hoses, each having an at least two-layer structure comprising, as an outer layer, the layer comprising the polyamide (A) and, as an inner layer, the layer comprising the fluorine-containing ethylenic polymer (B) and containing or not containing an electrically conductive material;

(ii) tubes or hoses, in particular automotive fuel piping or liquid agent transporting tubes or hoses, each having an at least three-layer structure comprising, as an outer layer, the layer comprising the polyamide (A); as an intermediate layer, the layer comprising the fluorine-containing ethylenic polymer (B); and, as an inner layer, the layer (C) comprising the fluorine-containing resin and containing or not containing an electrically conductive material, said fluorine-containing resin having a melting point not lower than 250° C.;

(iii) tubes or hoses, in particular automotive fuel piping tubes or hoses, each having an at least three-layer structure comprising, as an outer layer, the layer comprising the polyamide (A); as an intermediate layer, the layer comprising the fluorine-containing ethylenic polymer (B); and, as an inner layer, the layer (A') comprising the polyamide and containing or not containing an electrically conductive material as necessary; and (iv) tubes or hoses, in particular automotive fuel piping tubes or hoses, each having an at least four-layer structure comprising, as an outer layer, the layer comprising the polyamide (A); as an intermediate layer, the layer comprising the fluorine-containing ethylenic polymer (B); as an inner layer, the layer (C) comprising the fluorine-containing resin and not containing the electrically conductive material; and, as an innermost layer, the layer (D) comprising the fluorine-containing resin and containing an electrically conductive material, in which at least one of the fluorine-containing resin of the layer (C) and the fluorine-containing resin of the layer (D) has a melting point not lower than 250° C.

In the production method according to the invention, the multilayer laminate may have a jacket layer as the outermost layer thereof for the purpose of protection, antifouling, insulation and/or shock absorbance, etc. The jacket layer can appropriately be formed by the simultaneous coextrusion using a resin or a natural or synthetic rubber, for instance, or in a separate step of covering. It is also possible to reinforce the laminate with a metal or the like.

The multilayer laminate obtainable by the production method of the invention is excellent in low level of permeability particularly against liquid agents, namely such liquid agents capable of deteriorating polyamide resins as solvents or fuels, for example; organic acids such as acetic acid, formic acid, cresol and phenol; inorganic acids such as hydrochloric acid, nitric acid and sulfuric acid; solutions of alkalis such as sodium hydroxide and potassium hydroxide; alcohols such as methanol and ethanol; amines such as ethylenediamine, diethylenetriamine and ethanolamines; amides such as dimethylacetamide; esters such as ethyl acetate and butyl acetate; fuels such as gasoline, light oil and heavy oil, pseudofuels such as Fuel C, and mixed fuels composed of these and a peroxide, methanol, ethanol or the like; and other organic and inorganic liquids.

Best Modes For Carrying Out The Invention

The following examples illustrate the present invention in further detail. These examples are, however, by no means limitative of the scope of the present invention. In the following examples, various parameter measurements were carried out in the following manner.

(1) Determination of the Number of Carbonate Groups

The white powder of each fluorine-containing ethylenic polymer obtained or pieces cut from the melt-extruded pellets prepared therefrom were subjected to compression molding at room temperature to give a uniform film having a thickness of 0.05 to 0.2 mm. This film was subjected to infrared absorption spectrophotometry, and the absorbance of the carbonate (—OC(=O)O—) carbonyl-due peak ($v_{C=O}$) appearing at the absorption wavelength corresponding to 1809 cm$^{-1}$ was measured. The number (N) of carbonate groups per 10$^6$ main chain carbon atoms was calculated according to the formula (1) given below:

$$N=500 \, AW/\epsilon df \quad (1)$$

A: absorbance of the carbonate (—OC(=O)O—) group-due $v_{C=O}$ peak;

$\epsilon$: molar extinction coefficient of the carbonate (—OC(=O)O—) group-due $v_{C=O}$ peak [1·cm$^{-1}$·mol$^{-1}$]. $\epsilon$=170 was employed on a model compound basis;

W: average molecular weight of monomer units as calculated on the monomer composition basis;

d: film density [g/cm$^3$];

f: film thickness [mm].

Infrared absorption spectrometric analysis was carried out using a Perkin-Elmer FTIR spectrometer 1760X (product of Perkin-Elmer) by performing scanning 40 times. The baseline of the IR spectrum obtained was automatically determined using a Perkin-Elmer Spectrum for Windows Ver. 1.4 C, and the absorbance of the peak at 1809 cm$^{-1}$ was measured. The film thickness was measured using a micrometer.

(2) Determination of the Number of Carbonyl Fluoride Groups

A film obtained in the same manner as described above under (1) was subjected to infrared absorption spectrophotometry, and the absorbance of the carbonyl fluoride (—C(=O)F) carbonyl-due peak ($v_{C=O}$) appearing at the wavelength corresponding to 1880 cm$^{-1}$ was determined. Then, the number of carbonyl fluoride groups was calculated by means of the same formula (1) as used above under (1) except that $\epsilon$=600 was employed as the molar extinction coefficient [1·cm$^{-1}$·cm$^{-1}$] of the carbonyl fluoride carbonyl-due $v_{C=O}$ peak on a model compound basis.

(3) Determination of the Composition of the Fluorine-containing Ethylenic Polymer The determination was carried out by $^{19}$F-NMR analysis.

(4) Melting Point (Tm) Determination

Using a Seiko DSC apparatus, the temperature was raised at a rate of 10° C./min and the melting peaks were recorded. The temperature corresponding to the maximum value was reported as the melting point (Tm).

(5) MFR (Melt Flow Rate) Determination

Using a melt indexer (product of Toyo Seiki Seisakusho K.K.), the weights (g) of the polymer flowing out through a nozzle with a diameter of 2 mm and a length of 8 mm within a unit time (10 minutes) were measured under a load of 5 kg at different temperatures.

(6) Appearance of the Multilayer Tube Inside and Outside Surfaces

Each tube obtained was cut to give two semicircular sections and the outer and inner surfaces were evaluated by visual observation or under a stereoscopic microscope at a magnification up to 50 times, for surface roughness, foaming and other defects according to the following criteria:

○: no defects are observed;

Δ: some or other defects are observed on less than 2% of the whole surface;

X: some or other defects are observed on 2% or more of the whole surface.

(7) Multilayer Tube Adhesion Strength Determination

Test specimens with a width of 1 cm were cut from each tube and subjected to 180° peel testing at a rate of 25 mm/min on a Tensilon universal tester. The mean of five maximum values found on an elongation-tensile strength graph was reported as the interlayer adhesion strength.

(8) Tube Tensile Strength Measurement

The method described in SAE J 2260 was followed.

(9) Tube Tensile Elongation Measurement

The method described in SAE J 2260 was followed.

(10) Surface Resistivity Measurement

The method described in SAE J 2260 was followed.

(11) Tube Cold Temperature Impact Resistance Determination

The method used was as described in SAE J 2260. The result was expressed in terms of the number of tube specimens, out of 10, showing, in the burst test after the falling ball test, a burst pressure of not more than 75% of that before the falling ball test. Thus, for example, the result "0/10" indicates that all the tubes tested after the falling ball test showed a burst pressure exceeding 75% of that before the falling ball test.

The polyamides and fluorine-containing ethylenic polymers used in the following examples were as follows:

[Polyamides]

PA-A: Nylon 12, product of Ube Industries, designated 3030MI1, melting point 172–182° C., containing no plasticizer;

PA-B: Nylon 12, product of Ube Industries, designated 3030MJ1, melting point 169–179° C., containing a plasticizer;

PA-C: Nylon 12, product of Ube Industries, designated 3035JU, melting point 166–170° C., containing a plasticizer;

PA-D: Nylon 12, product of Ube Industries, designated 3035LU, melting point 170–180° C., containing no plasticizer.

[Fluorine-Containing Ethylenic Polymers, Fluororesins]

F-A to F-G: Products synthesized in Synthesis Examples 1 to 7 to be mentioned later herein;

F-H: Fluororesin Neoflon (registered trademark) ETFE, product of Daikin Industries, designated EP-521, melting point about 265° C., MFR 14.8 (g/10 min, 297° C.);

F-I: Fluororesin Neoflon (registered trademark) ETFE, product of Daikin Industries, designated EP-610, melting point about 220° C., MFR 26.7 (g/10 min, 297° C.);

F-J: Fluororesin Neoflon (registered trademark) ETFE containing an electrically conductive material, product of Daikin Industries, designated EP-610AS, melting point about 220° C., MFR 6.8 (g/10 min, 265° C.);

F-K: Melt-moldable fluororesin composite Neoflon (registered trademark) FMC, product of Daikin Industries, designated EA-LR43 (fluororesin-nylon blend), MFR 6.5 (g/10 min, 235° C.).

SYNTHESIS EXAMPLE 1

Synthesis of Fluorine-containing Ethylenic Polymer F-A

An autoclave was charged with 380 L of distilled water and, after thorough nitrogen purging, charged with 75 kg of 1-fluoro-1,1-dichloroethane, 155 kg of hexafluoropropylene and 0.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.4 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene=40.5/44.5/15.0 mole percent was continuously fed to maintain the system inside pressure at 1.0 MPa. As for perfluoro(1,1,5-trihydro-1-pentene), a total of 1.5 kg was charged continuously. Stirring was continued for 20 hours. Then, after depressurization to atmospheric pressure, the reaction product was washed with water and dried to give 200 kg of a powder (fluorine-containing ethylenic polymer F-A). The results of analyses of this product are shown in Table 1.

SYNTHESIS EXAMPLES 2 AND 3

Synthesis of Fluorine-containing Ethylenic Polymers F-B and F-C

Fluorine-containing ethylenic polymers F-B and F-C were produced in the same manner as in Synthesis Example 1. The results of analysis of these are shown in Table 1.

Synthesis Example 4

Synthesis of fluorine-containing ethylenic polymer F-D

An autoclave was charged with 400 L of distilled water and, after thorough nitrogen purging, charged with 320 kg of perfluorocyclobutane, 80 kg of hexafluoropropylene, 19 kg of tetrafluoroethylene and 6 kg of vinylidene fluoride, and the system inside was maintained at 35° C. and at a stirring rate of 180 rpm. Thereafter, 5 kg of di-n-propyl peroxydicarbonate was charged to initiate the polymerization. As the polymerization progressed, the system inside pressure decreased, so that a mixed gas composed of tetrafluoroethylene/vinylidene fluoride/hexafluoropropylene=50/40/10 mole percent was continuously fed to maintain the system inside pressure at a constant level. Stirring was continued for 30 hours. Then, after depressurization to atmospheric pressure, the reaction product was washed with water and dried to give 200 kg of a powder (fluorine-containing ethylenic polymer F-D). The results of analyses of this product are shown in Table 1.

Synthesis Example 5

Synthesis of fluorine-containing ethylenic polymer F-E

An autoclave was charged with 400 L of distilled water and, after thorough nitrogen purging, charged with 75 kg of 1-fluoro-1,1-dichloroethane, 190 kg of hexafluoropropylene and 1.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.6 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene=40.5/42.5/17.0 mole percent was continuously fed to maintain the system inside pressure at 1.0 MPa. Stirring was continued for 30 hours. Then, after depressurization to atmospheric pressure, the reaction product was washed with water and dried to give 172 kg of a powder. The powder obtained was then extruded at a cylinder temperature of 320° C. using a single screw extruder (product of Tanabe Practice Kikai, VS 50-24) to give pellets (fluorine-containing ethylenic polymer F-E). The results of analyses of this product are shown in Table 1.

Synthesis Example 6

Synthesis of fluorine-containing ethylenic polymer F-F

The fluorine-containing ethylenic polymer F-B obtained in Synthesis Example 2 was dry-blended with an electrically conductive material (acetylene black) in a mixing ratio of 85/15 by weight, and the mixture was melted and kneaded in the same manner as in Synthesis Example 5 except that the cylinder temperature was 245° C. The results of analyses of the thus-obtained pellets (fluorine-containing ethylenic polymer F-F) are shown in Table 1.

Synthesis Example 7

Synthesis of fluorine-containing ethylenic polymer F-G

An autoclave was charged with 9.5 kg of the powder of fluorine-containing ethylenic polymer F-B as obtained in Synthesis Example 2, 700 g of 28% ammonia water and 10 L of distilled water, the system was heated with stirring, and stirring was continued for 7 hours while maintaining the temperature at 80° C. The contents were washed with water and subjected to drying treatment to give 9.2 kg of a powder. By such treatment, the active functional groups (carbonate groups and carbonyl fluoride groups) contained in the resin were converted to amide groups, which are chemically and thermally stable. The quantitative progress of such conversion was confirmed by infrared spectrophotometry. The results of analyses of the resin after treatment are shown in Table 1. In Table 1, TFE stands for tetrafluoroethylene, Et for ethylene, HFP for hexafluoropropylene, VdF for vinylidene fluoride, and HF-Pe for perfluoro(1,1,5-trihydro-1-pentene).

TABLE 1

| Fluorine-containing ethylenic polymer | | Monomer composition (mole %) | | | | | Number of groups per 10^6 main chain carbon atoms | | Melting point (° C.) | MFR (g/10 min) (measurement temp.) (° C.) |
|---|---|---|---|---|---|---|---|---|---|---|
| | | TFE | Et | HFP | VdF | HF-Pe | Carbonate group | Carbonyl fluoride group | | |
| Synthesis example 1 | F-A | 40.8 | 44.8 | 13.9 | — | 0.5 | 300 | 3 | 162.5 | 2.6 (230) |
| Synthesis example 2 | F-B | 46.2 | 43.8 | 9.5 | — | 0.5 | 255 | 5 | 194.3 | 8.9 (230) |
| Synthesis example 3 | F-C | 47.1 | 44.1 | 8.3 | — | 0.5 | 189 | 7 | 207.4 | 8.3 (230) |
| Synthesis example 4 | F-D | 51.3 | — | 9.8 | 38.9 | — | 311 | 3 | 169.2 | 13.8 (230) |
| Synthesis example 5 | F-E | 40.5 | 45.0 | 14.0 | — | 0.5 | 67 | 67 | 170.2 | 11.3 (230) |
| Synthesis example 6 | F-F | 46.1 | 43.8 | 9.6 | — | 0.5 | 76 | 38 | 196.1 | 4.2 (265) |
| Synthesis example 7 | F-G | 46.1 | 43.8 | 9.6 | — | 0.5 | Not detected | Not detected | 193.5 | 9.8 (230) |

Multilayer Tube Molding and Evaluation Thereof

EXAMPLE 1

Using a tube extrusion apparatus for three components and three layers equipped with a spiral multi-manifold die, a tube with an inside diameter of 6 mm and an outside diameter of 8 mm was molded continuously by feeding the polyamide PA-A, the fluorine-containing ethylenic polymer F-A and the commercially available electric conductive fluororesin F-J so that they might form the outer layer, intermediate layer and inner layer, respectively. The size of the die mandrel was 12 mm/16 mm. The molding conditions and the results of evaluation of the tube obtained are shown in Table 2. The flat portion of the die mandrel had a length of 50 mm (in the table, referred to as "die length").

TABLE 2

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Outer layer resin | | PA-A | PA-A | PA-A | PA-A | PA-A | PA-A | PA-A | PA-A | PA-A | PA-A | PA-A | PA-A | PA-A |
| Intermediate layer resin | | F-A | F-A | F-A | F-B | F-C | F-E | F-A | F-A | F-A | — | — | — | — |
| Inner layer resin | | F-J | F-J | F-J | F-J | F-J | F-J | F-I | F-I | F-H | F-A | F-D | F-F | F-F |
| Innermost layer resin | | — | — | — | — | — | — | — | F-J | F-J | — | — | — | — |
| Cylinder temp. (° C.) | Outer layer | 245 | 245 | 245 | 245 | 245 | 245 | 245 | 245 | 245 | 245 | 245 | 245 | 245 |
| | Intermediate layer | 265 | 265 | 265 | 275 | 275 | 265 | 265 | 265 | 265 | — | — | — | — |
| | Inner layer | 330 | 330 | 330 | 330 | 330 | 330 | 300 | 300 | 330 | 265 | 250 | 275 | 275 |
| | Innermost layer | — | — | — | — | — | — | — | 330 | 330 | — | — | — | — |
| Die temperature (° C.) | | 280 | 280 | 280 | 280 | 270 | 280 | 280 | 280 | 285 | 280 | 280 | 280 | 300 |
| Tube line speed (m/min) | | 8.0 | 4.0 | 12.0 | 8.0 | 8.0 | 8.0 | 8.0 | 8.0 | 8.0 | 8.0 | 8.0 | 8.0 | 8.0 |
| Thickness of each layer (mm) | Outer layer | 0.76 | 0.76 | 0.76 | 0.75 | 0.74 | 0.74 | 0.75 | 0.75 | 0.75 | 0.70 | 0.69 | 0.69 | 0.69 |
| | Intermediate layer | 0.10 | 0.10 | 0.10 | 0.09 | 0.10 | 0.10 | 0.10 | 0.10 | 0.10 | — | — | — | — |
| | Inner layer | 0.15 | 0.15 | 0.15 | 0.15 | 0.15 | 0.15 | 0.16 | 0.10 | 0.10 | 0.30 | 0.30 | 0.30 | 0.30 |
| | Innermost layer | — | — | — | — | — | — | — | 0.05 | 0.05 | — | — | — | — |
| Die length (mm) | | 50 | 50 | 50 | 50 | 50 | 50 | 50 | 50 | 50 | 50 | 50 | 50 | 50 |
| Tube tensile strength (Mpa) | | 36 | 37 | 31 | 36 | 36 | 35 | 36 | 36 | 33 | 35 | 36 | 35 | 34 |
| Tube tensile elongation (%) | | >200 | >200 | >200 | >200 | >200 | >200 | >200 | >200 | >200 | >200 | >200 | >200 | >200 |
| Cold temperature impact resistance | | 0/10 | 0/10 | 0/10 | 0/10 | 0/10 | 0/10 | 0/10 | 0/10 | 0/10 | 0/10 | 0/10 | 0/10 | 0/10 |
| Appearance of tube inside and outside surface | | ○ | ○ | ○ | ○ | ○ | ○ | ○ | ○ | ○ | ○ | ○ | ○ | ○ |
| Adhesion strength (N/cm) | | 40.8 | 40.2 | 41.0 | 39.5 | 35.8 | 32.0 | 36.1 | 39.1 | 40.3 | 37.4 | 32.0 | 30.0 | 35.0 |
| Surface resistivity (MΩ/□) | | 0.04 | 0.03 | 0.06 | 0.05 | 0.05 | 0.05 | — | 0.1 | 0.1 | — | — | 0.01 | 0.01 |

EXAMPLES 2 AND 3

Multilayer tubes were molded in the same manner as in Example 1 except that the tube line speed was changed. The molding conditions and the results of evaluation of the tubes obtained are shown in Table 2.

From these results, it could be confirmed that sufficient levels of adhesiveness can be attained even when the line speed is changed.

EXAMPLES 4 TO 6 AND COMPARATIVE EXAMPLES 1 AND 2

Multilayer tubes were molded in the same manner as in Example 1 except that the fluorine-containing ethylenic polymer for forming the intermediate layer was changed and the cylinder temperature was changed according to that material (Examples 4 to 6 and Comparative Example 1). Further, a multilayer tube was molded in the same manner as in Example 1 except that the die temperature was lowered (Comparative Example 2). The molding conditions and the results of evaluation of the tubes obtained are shown in Table 2 (Examples 4 to 6) and Table 3 (Comparative Examples 1 and 2).

As these results indicate, high adhesion strength values exceeding 30 N/cm were obtained, like in Example 1 where F-A was used, when the fluorine-containing ethylenic polymer F-B, F-C or F-E was used in forming the intermediate layer. When the fluorine-containing ethylenic polymer F-G was used for forming the intermediate layer and the die temperature was set at 255° C., the multilayer tube showed no adhesion at all between PA-A and F-G. On the other hand, when the die temperature was raised to 320° C., the foaming of the PA-A layer became remarkable and no adhesion was found at all between PA-A and F-G. These facts sufficiently evidenced the effects of the present invention. Even when the fluorine-containing ethylenic polymer F-A was used for forming the intermediate layer, no satisfactory adhesion strength was obtained between that layer and the outer layer when the die temperature was low.

EXAMPLE 7

A multilayer tube was molded in the same manner as in Example 1 except that F-I was used as the fluorine-containing ethylenic polymer for forming the inner layer and the cylinder temperature was changed accordingly. The molding conditions and the results of evaluation of the tube obtained are shown in Table 2. As the results shown in Table 2 indicate, firm adhesion, like in the case of the use of the conductive fluororesin, was attained even when the non-conductive fluororesin F-1 was used for forming the inner layer.

EXAMPLES 8 AND 9

Using a tube extrusion machine for four components and four layers equipped with a spiral multi-manifold die, tubes with an inside diameter of 6 mm and an outside diameter of 8 mm were molded continuously by feeding the polyamide resin PA-A, the fluorine-containing ethylenic polymer F-A, the fluororesin F-I (Example 8) or F-H (Example 9) and the conductive fluororesin F-J so that they might form the outer layer, intermediate layer, inner layer and innermost layer, respectively. The molding conditions and the results of evaluation of the tubes obtained are shown in Table 2. As the results shown in Table 2 indicate, sufficiently high adhesion strength was obtained even when the inner layer was composed of two layers. The ETFE having a high melting point excellent in fuel impermeability could be extrusion-molded (Example 9) as well.

EXAMPLES 10 TO 13 AND COMPARATIVE EXAMPLES 3 TO 5

Using a tube extrusion machine for two components and two layers equipped with a spiral multi-manifold die, tubes with an inside diameter of 6 mm and an outside diameter of 8 mm were molded continuously by feeding the polyamide resin PA-A and the fluorine-containing ethylenic polymers so that they might form the outer layer and inner layer, respectively. The molding conditions and the results of evaluation of the tubes obtained are shown in Table 2 (Examples 10 to 13) and Table 3 (Comparative Examples 3 to 5). As the results shown in the tables indicate, the multilayer tube obtained by using the fluorine-containing ethylenic polymer F-G and a die temperature of 255° C. showed no adhesion at all between PA-A and F-G. On the other hand, when the die temperature was raised to 320° C., the foaming of the PA-A layer was remarkable and no adhesion was found at all between PA-A and F-G. These facts sufficiently evidenced the effects of the present invention. Even when the fluorine-containing ethylenic polymer F-A was used, no satisfactory adhesion strength was obtained between the layer thereof and the outer layer when the die temperature was low. When the die temperature was raised excessively, the external appearance was impaired due to foaming and so on; in addition, sizing could not be performed, hence any proper multilayer tubes could not be obtained, hence the tube performance characteristics could not be measured.

EXAMPLES 14 AND 15 AND COMPARATIVE EXAMPLES 6 AND 7

Multilayer tubes were molded in the same manner as in Example 1 except that the outer layer-forming polyamide was changed. The molding conditions and evaluation results are shown in Table 3. As the results shown in the table indicate, sufficiently high levels of adhesion strength could be obtained, even when the plasticizer-containing polyamides were used in lieu of the plasticizer-free ones. On the other hand, when the die temperature was low, no sufficient adhesion strength could be obtained even when the fluorine-containing ethylenic polymer F-A or F-B was used as the intermediate layer, as indicated by the results in the comparative examples.

TABLE 3

| | Example | | | | Comparative example | | | | | | |
|---|---|---|---|---|---|---|---|---|---|---|---|
| | 14 | 15 | 16 | 17 | 1 | 2 | 3 | 4 | 5 | 6 | 7 |
| Outer layer resin | PA-B | PA-C | PA-B | PA-A | PA-A | PA-A | PA-A | PA-A | PA-A | PA-B | PA-C |
| Intermediate layer resin | F-A | F-A | F-A | F-A | F-G | F-A | — | — | — | F-A | F-B |
| Inner layer resin | F-J | F-J | F-J | F-J | F-J | F-J | F-G | F-A | F-A | F-J | F-J |
| Innermost layer resin | — | — | — | — | — | — | — | — | — | — | — |
| Cylinder temp. (° C.) Outer layer | 245 | 245 | 245 | 245 | 245 | 245 | 245 | 245 | 245 | 245 | 245 |
| Intermediate layer | 265 | 265 | 265 | 265 | 265 | 265 | — | — | — | 275 | 265 |
| Inner layer | 330 | 330 | 330 | 330 | 330 | 330 | 250 | 265 | 265 | 330 | 330 |
| Innermost layer | — | — | — | — | — | — | — | — | — | — | — |
| Die temperature (° C.) | 280 | 280 | 280 | 280 | 255 | 245 | 255 | 245 | 320 | 245 | 250 |
| Tube line speed (m/min) | 8.0 | 8.0 | 20.0 | 4.0 | 8.0 | 8.0 | 8.0 | 8.0 | 8.0 | 8.0 | 8.0 |
| Thickness of each layer (mm) Outer layer | 0.76 | 0.76 | 0.76 | 0.76 | 0.75 | 0.75 | 0.69 | 0.70 | 0.70 | 0.75 | 0.75 |
| Intermediate layer | 0.10 | 0.10 | 0.10 | 0.10 | 0.11 | 0.11 | — | — | — | 0.11 | 0.09 |
| Inner layer | 0.15 | 0.15 | 0.15 | 0.15 | 0.15 | 0.15 | 0.30 | 0.30 | 0.30 | 0.15 | 0.15 |
| Innermost layer | — | — | — | — | — | — | — | — | — | — | — |
| Die length (mm) | 50 | 50 | 50 | 200 | 50 | 50 | 50 | 50 | 50 | 50 | 50 |
| Tube tensile strength (Mpa) | 37 | 39 | 31 | 35 | 35 | 34 | 35 | 33 | Not measurable | 34 | 38 |
| Tube tensile elongation (%) | >200 | >200 | >200 | >200 | >200 | >200 | >200 | >200 | Not measurable | >200 | >200 |
| Cold temperature impact resistance | 0/10 | 0/10 | 0/10 | 0/10 | 0/10 | 0/10 | 0/10 | 0/10 | Not measurable | 0/10 | 0/10 |
| Appearance of tube inside and outside surface | ○ | ○ | ○ | ○ | ○ | ○ | ○ | ○ | X | ○ | ○ |
| Adhesion strength (N/cm) | 40.1 | 39.0 | 40.1 | 43.9 | 7.2 | 15.0 | 11.0 | 12.1 | Not measurable | 12.4 | 16.2 |
| Surface resistivity (MΩ/□) | 0.04 | 0.04 | 0.08 | 0.03 | 0.05 | 0.05 | — | — | — | 0.05 | 0.06 |

Example 14 except that the line speed was set at 20 m/minute and the mandrel size was changed to 18 mm/24 mm. The molding conditions and evaluation results are shown in Table 3. From the table, it is seen that sufficiently firm adhesion could be obtained even when the draw down ratio was increased.

EXAMPLE 17

A multilayer tube was molded in the same manner as in Example 2 except that the length of the flat section of the die mandrel was 200 mm. The molding conditions and evaluation results are shown in Table 3. From the table, it is seen that a sufficient adhesion strength could be obtained even when the length of the flat portion was increased.

EXAMPLES 18 AND COMPARATIVE EXAMPLES 8 AND 9

Multilayer Blow-molded Containers and Evaluation Thereof

Using a blow molding machine for two components and two layers equipped with a die having a die diameter of 12 mm and a core diameter of 8.5 mm together with a feed block, cylindrical molded articles having a diameter of 40 mm and a height of 300 mm were molded. The molding conditions and the results of evaluation of the molded articles obtained are shown in Table 4. The adhesion strength was measured along the longitudinal direction of the cylinder side. As seen from the table, sufficiently firm adhesion strength could be obtained.

On the other hand, attempts were made to mold multilayer containers by blow molding in the same manner as in Example 18 except that the feed block and die temperatures were each set at 250° C. The containers obtained were inferior in interlayer adhesion strength (Comparative Example 8). Therefore, the feed block and die temperatures were each raised, whereupon, at 320° C., the melt viscosity of the polyamide, in particular, markedly lowered and any cylindrical parison could not be molded due to the draw down phenomenon (Comparative Example 9).

TABLE 4

| | Example | Comparative example | |
|---|---|---|---|
| | 18 | 8 | 9 |
| Outer layer resin | PA-D | PA-D | PA-D |
| Inner layer resin | F-A | F-A | F-A |
| Cylinder temp. (° C.) Outer layer | 235 | 235 | 235 |
| Inner layer | 240 | 240 | 240 |
| Die temperature (° C.) | 275 | 250 | 320 |
| Feed block temperature (° C.) | 275 | 250 | 320 |
| Thickness of each layer (mm) Outer layer | 0.70 | 0.69 | — |
| Inner layer | 0.30 | 0.30 | — |
| Adhesion strength (N/cm) | 30.9 | 10.1 | — |

INDUSTRIAL APPLICABILITY

The present invention, which has the constitution described above, can markedly improve the interlayer adhesion strength of multilayer laminates, in particular the interlayer adhesion strength between a polyamide and a fluorine-containing ethylenic polymer, as compared with the prior art production methods in a simple and easy manner. Furthermore, the adhesion strength of the multilayer laminate as a whole can be markedly improved by using a fluorine-containing ethylenic polymer having carbonyl groups, without requiring any additional step, and a multilayer laminate excellent in cold temperature impact resistance can be produced by simultaneous multilayer coextrusion using a commercially available polyamide. Therefore, the molding can be provided with good mechanical properties and high-level durability in an external environment, for example against heat and various chemical substances, by disposing such a polyamide as an outer layer and, in addition, a multilayer laminate can economically be produced by disposing a fluorine-containing resin layer as the innermost layer to thereby provide the molding with those heat resistance, oil resistance, chemical resistance and low level of liquid agent permeability which the fluorine-containing resin has. This is very advantageous from the industrial point of view.

The invention claimed is:

1. A production method of a multilayer laminate which comprises laminating at least a polyamide (A) and a fluorine-containing ethylenic polymer (B) by simultaneous multilayer coextrusion using a coextrusion apparatus to obtain the laminate comprising said polyamide (A) and said fluorine-containing ethylenic polymer (B),
said coextrusion apparatus comprising a die and a plurality of extruders for feeding resins to said die,
the temperature of said die being set within the range of not lower than 270° C. but not higher than 310° C., and said polyamide (A) being nylon 11 or nylon 12.

2. The production method according to claim 1, wherein the temperature of a feed block, in case that the feed block is connected to the die, is also set within the range of not lower than 270° C. but not higher than 310° C.

3. The production method according to claim 2, wherein a cylinder temperature of the extruder for feeding the polyamide (A) to the die is set at a level higher by 20 to 90° C. than the melting point of the polyamide (A).

4. The production method according to claim 2, wherein the temperature of the polyamide (A) at a resin inlet of the die, or of the feed block in case that the feed block is connected to the die, is set at a level higher by 20 to 90° C. than the melting point of the polyamide (A),
said resin inlet being connected to the extruder.

5. The production method according to claim 2, wherein the fluorine-containing ethylenic polymer (B) is a fluorine-containing ethylenic polymer having a carbonyl group.

6. The production method according to claim 1, wherein a cylinder temperature of the extruder for feeding the polyamide (A) to the die is set at a level higher by 20 to 90° C. than the melting point of the polyamide (A).

7. The production method according to claim 1, wherein the temperature of the polyamide (A) at a resin inlet of the die, or of the feed block in case that the feed block is connected to the die, is set at a level higher by 20 to 90° C. than the melting point of the polyamide (A),
said resin inlet being connected to the extruder.

8. The production method according to claim 1, wherein the fluorine-containing ethylenic polymer (B) is a fluorine-containing ethylenic polymer having a carbonyl group.

9. The production method according to claim 1, wherein the carbonyl group content of the fluorine-containing ethylenic polymer (B) having the carbonyl group is 3 to 1,000 groups, in total, per $1\times10^6$ main chain carbon atoms.

10. The production method according to claim 1, wherein the fluorine-containing ethylenic polymer (B) is at least one species selected from the group consisting of:

(I) copolymers resulting from polymerization at least of 5 to 95 mole percent of tetrafluoroethylene and 95 to 5 mole percent of ethylene;

(II) copolymers resulting from polymerization at least of 3 to 97 mole percent of tetrafluoroethylene and 97 to 3 mole percent of a compound represented by the general formula $$CF_2=CF-Rf^1$$

in the formula, $Rf^1$ represents $CF_3$ or $ORf^2$ and $Rf^2$ represents a perfluoroalkyl group having 1 to 5 carbon atoms;

(III) copolymers resulting from polymerization at least of:
a. 20 to 90 mole percent of tetrafluoroethylene;
b. 10 to 80 mole percent of ethylene; and
c. 1 to 70 mole percent of a compound represented by the general formula:

$$CF_2=CF-Rf^1$$

in the formula, $Rf^1$ represents $CF_3$ or $ORf^2$ and $Rf^2$ represents a perfluoroalkyl group having 1 to 5 carbon atoms;

(IV) copolymers resulting from polymerization of at least vinylidene fluoride; and (V) copolymers resulting from polymerization at least of:
d. 15 to 60 mole percent of vinylidene fluoride;
e. 35 to 80 mole percent of tetrafluoroethylene; and
f. 5 to 30 mole percent of hexafluoropropylene.

11. The production method according to claim 1, wherein the fluorine-containing ethylenic polymer (B) has a melting point of 150 to 270° C.

12. The production method according to claim 1, wherein the initial interlayer adhesion strength between a layer comprising the polyamide (A) and a layer comprising the fluorine-containing ethylenic polymer (B) of the multilayer laminate is not less than 20 N/cm.

13. The production method according to claim 1, wherein the multilayer laminate is selected from the group consisting of films, sheets, profiles, pipes, hoses, tubes, bottles and tanks.

14. The production method according to claim 13, wherein the multilayer laminate is an automotive fuel piping tube or hose each having an at least three-layer structure comprising, as an outer layer, a layer comprising the polyamide (A); as an intermediate layer, a layer comprising the fluorine-containing ethylenic polymer (B); and, as an inner layer, a layer (C) comprising a fluorine-containing resin and containing or not containing an electrically conductive material,
said fluorine-containing resin having a melting point of not lower than 250° C.

15. The production method according to claim 13, wherein the multilayer laminate is an automotive fuel piping tube or hose each having an at least four-layer structure comprising, as an outer layer, a layer comprising the polyamide (A); as an intermediate layer, the layer comprising the fluorine-containing ethylenic polymer (B); as an inner layer, a layer (C) comprising a fluorine-containing resin and not containing an electrically conductive material; and, as an innermost layer, a layer (D) comprising a fluorine-containing resin and containing an electrically conductive material,
at least one of the fluorine-containing resin of the layer (C) and the fluorine-containing resin of the layer (D) having a melting point of not lower than 250° C.

16. The production method according to claim 1, wherein a draw down ratio is 4 to 9.

* * * * *